United States Patent [19]

Thornton

[11] Patent Number: 4,538,377
[45] Date of Patent: Sep. 3, 1985

[54] IRRIGATION SYSTEM

[76] Inventor: Ken O. Thornton, 215 E. Grimes St., Polk City, Iowa 50226

[21] Appl. No.: 539,704

[22] Filed: Oct. 6, 1983

[51] Int. Cl.³ .................. A01C 23/04; A01G 25/06; E02B 11/00
[52] U.S. Cl. .................................. 47/1 R; 405/39; 405/51
[58] Field of Search ............... 405/36, 37, 38, 39, 405/50, 51; 47/1 R, 48.5

[56] References Cited

U.S. PATENT DOCUMENTS

| 3,307,360 | 3/1967 | Bailly | 405/38 |
| 4,180,348 | 12/1979 | Taylor | 405/39 |
| 4,221,501 | 9/1980 | Saguri | 405/37 |

FOREIGN PATENT DOCUMENTS 2405330  6/1979  France .................. 405/38

Primary Examiner—David H. Corbin
Attorney, Agent, or Firm—Zarley, McKee, Thomte, Voorhees & Sease

[57] ABSTRACT

A field crop treatment system, characterized by a first treatment pipe submerged under the root system of growing field crops, and a second drain pipe submerged under the treatment pipe. The system is connected in such a manner that it can operate in several modes. Among the modes are a drainage mode wherein both pipes drain the water from a wet field; and an irrigation mode wherein the top pipe is used to irrigate at the underground level. In addition, the system may be used in various modes between complete drainage and complete irrigation to allow underground application of chemicals, herbicides and the like.

10 Claims, 2 Drawing Figures

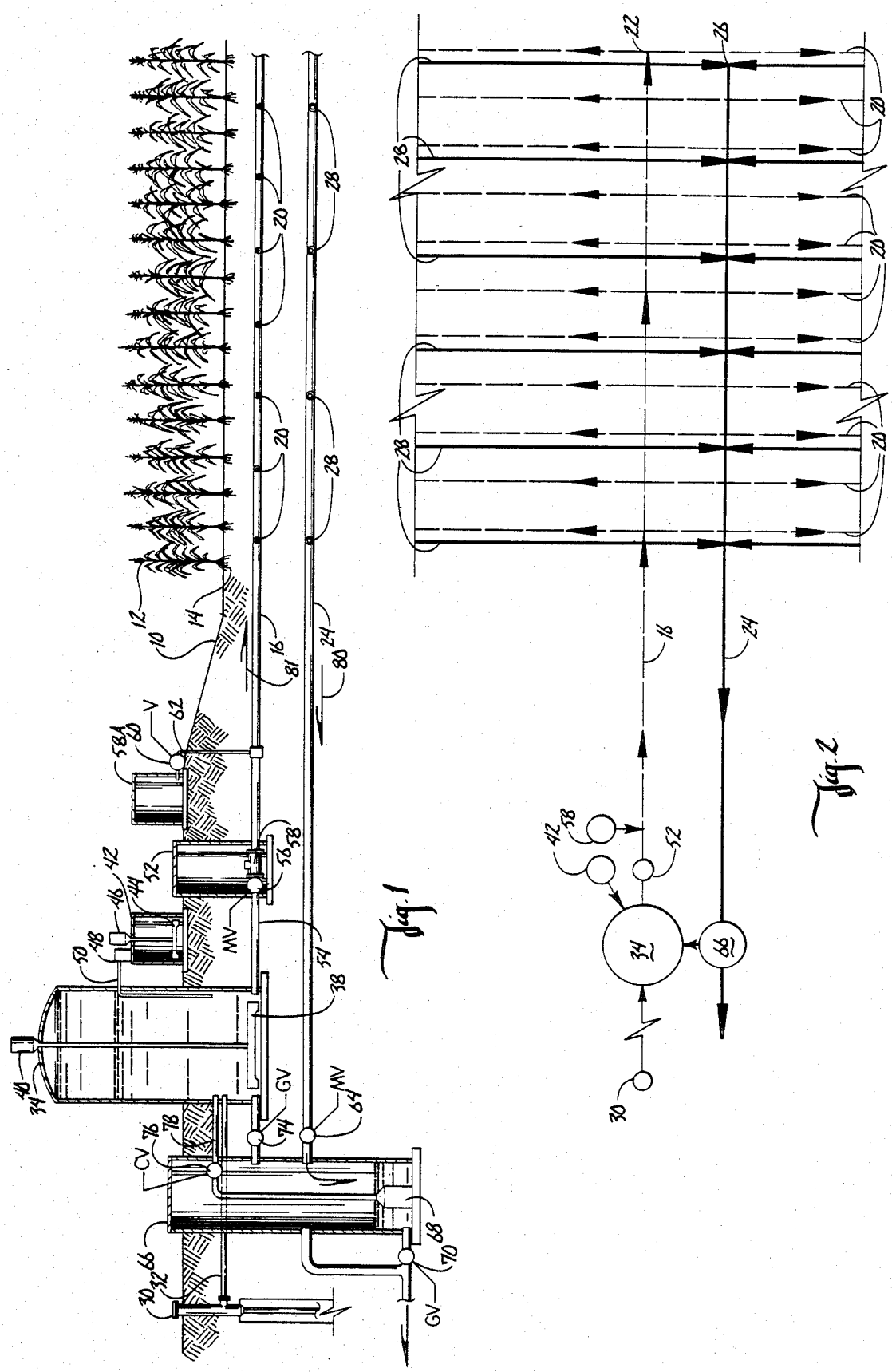

IRRIGATION SYSTEM

BACKGROUND OF THE INVENTION

In the heartland of our country where row crops are commonly grown, field conditions can vary widely during the growing season. For example, in the early part of the growing season, it is often very wet and soggy. Conversely, in later parts of the growing season, it is often very arid and dry. Most ideal crop yields come when there is a controlled amount of water meeting the demands of the growing crops at any given time. The constant exposure to too much water, followed by too little water, will actually cause significant deterioration of crops. In some instances, such changes in moisture level will cause not only reduced yields, but total crop failure.

One of the common occurring problems with high moisture level in the spring is that it promotes shallow root development. Shallow root development is, of course, undesirable because such does not encourage maximum moisture uptake during the more arid times of the year and it also discourages nutrient uptake with the result being reduced crop yields.

There are, of course, irrigation systems which are available for use during the more arid times of the year. But the commonly used systems merely involve surface application of moisture. The center pivot irrigation systems are typical examples. These are inefficient because of the tremendous loss of water via evaporation. They also do little to encourage deep rooting, which is desirable. In fact, they discourage deep rooting. The systems are also very expensive.

Another problem with conventional field systems involves applications of chemicals, fertilizer nutrients, herbicides, etc. These are all applied at the surface. The surface application of these, just as surplus application of irrigating water, is inefficient for numerous reasons. Amongst those is that surface application does not place the applied treatment chemicals where they are needed, namely, below the soil for the greatest effect. Also, surface application means many passes over the field with tractors and the like, which is very time consuming and expensive because of the fuel consumed.

This invention has as its primary objective, the development of a field crop treatment system which can be operated in a variety of modes, completely changing the mode of operation depending upon the field moisture conditions.

Another objective of the present invention is to develop a system which can be operated in an irrigation mode and/or a water drainage mode.

Another objective of the present invention is to provide a field treatment system which allows application of both irrigating water and treating chemicals under the ground to allow maximum effect upon the plant to enhance its nutrition, root development and water uptake.

Another objective of the present invention is to provide a field crop treatment system which can literally be tailored to all conditions for spoon feeding of the crop during the growing year.

Another objective of the present invention is to provide a crop field treatment system which itself is fairly inexpensive and highly cost effective, and which eliminates the need for tractors making multiple field passes during the early spring.

An even further objective is to allow application of nutrients, such as fertilizer, anhydrous, etc. to field crops in a system balanced with the available field water system to allow the chemicals to recirculate in a loop system for the greatest efficiency.

Yet another objective of the present invention is to provide an irrigation system which irrigates under the ground and avoids the evaporation losses of above ground irrigation.

The method and manner of accomplishing each of these objectives as well as others, will become apparent from the detailed description which follows hereinafter.

BRIEF DESCRIPTION OF THE DRAWINGS

FIG. 1 shows an elevated view of the field crop treatment system.

FIG. 2 shows a plan view of the system showing the main treatment pipeline and the main drain pipeline with the lateral extending pipes which scatter throughout the field.

SUMMARY OF THE INVENTION

A field crop treatment system for treatment of field crops growing on the top soil surface, which involves a treatment pipe submerged below the root system of the field crops, and a drain pipe submerged beneath the treatment pipe. The treatment pipe itself is connected to a water distribution source, and a chemicals distribution source, either of which may be optionally opened, closed or partially opened, or partially closed. The drain pipe is connected to a water storage source for storing field drained water. The field drained water may be transferred to the storage tank for recycling during arid times.

DETAILED DESCRIPTION OF THE INVENTION

The field crop treatment system is best depicted in FIG. 1. There it can be seen that the top soil 10 is sustaining growing row crops, illustrated by corn 12. The row crops have roots 14 extending below the surface. Below the roots and perhaps at a level of about 18–20 inches, is a first submerged treatment pipe 16. Treatment pipe 16 has a plurality of laterally extending carrying pipes (see FIG. 2) 18, which is illustrated by the junctures shown at 20. For purposes of description, the forward end of treatment pipe 16 will be designated as 22. Field treatment pipe 16 is ideally made of a semi-rigid thick walled, plastic piping material which is readily commercially available.

Submerged beneath but in generally parallel fashion to treatment pipe 16 is a second pipe, referred to herein as drain pipe 24. Drain pipe 24 has a forward end 26 and in like fashion to treatment pipe 16, has a plurality of laterally extending carriers 28. The lateral extending pipes 28 are in full fluid communication with drain pipe 24 as are the laterally extending carrier pipes 18 from treatment pipe 16.

Positioned somewhat away from the field crops, but in very close proximity, is the water, chemical and nutrient storage system. Depicted at 30 is a conventional farm water well. Well 30 is fluidly connected via line 32 to storage tank 34. Storage tank 34 has a conventional tank agitator blade 38, driven by motor 40. Chemicals tank 42 has a like agitator 44 and motor 46. Pump 48 and line allow chemicals to be pumped from chemical tank 42 via pump 48 through line 50 into storage tank 34, wherein they can be mixed and agitated and stored with water. Metering pit 52 is in fluid communication with storage tank 34 via line 54 and metering valve 56. Metering pit 52 also contains flow meter 58, which is electrically connected by a conventional means not depicted, to chemical tank 42 to control the injection of chemicals into the storage system based upon sensing the flow rate through metering valve 56 and line 54 out from storage tank 34. Compressor 58 is connected via a conventional valve 60 fluidly to treatment pipe line 16. Compressor 58 allows injection via opening of valve 60 and injection line 62 of anhydrous ammonia and air into treatment pipe 16.

Drain pipe 24 is connected via metering valve 64 to lift station tank 66. Lift station 66 allows for storage of drained water. Station 66 a submersible pump 68, and a gate valve or blow-down valve 70. valve 70 may be opened to completely empty and discharge lift station 66. Submersible pump 68 may be connected to an automatic sensing flow valve for low water shut off. Lift station tank 66 is also in direct fluid communication via gate valve 74 with the bottom of hold or storage tank 34. In addition, it is similarly connected to storage tank 34 via control valve 76 on line 78. If one desires to empty the entire system, one can open all of the metering valves and open gate valves 74 and gate valves 70, and all will drain from storage tank 34 into lift station tank 66 and out gate valve 70.

In actual operation, the system can operate in a variety of useful modes. Let us assume, for example, that it is the early spring of the year, with plenty of available water. Metering valve 56 on line 54 would be closed. Metering valve 64 on drain pipe 24 would be fully open. Thus, as water in excess falls, it will drain down to the open drain pipe 24 and drain into pipe 24 and back via arrow 80 through metering valve 64 into the lift station tank 66. Water can be stored in tank 66 as desired, or discharged therefrom as desired via blow-down valve 70. Since the excess water is draining away from plants via the deeper submerged drain pipe 24, this encourages the development of a deeper and more firm root system. If the water is excessively high, and drain pipe 24 cannot carry away sufficient excess water, treatment pipe 16 can also be used as a drain pipe allowing a dual drainage system. This is accomplished simply by opening metering valve 56, and opening gate valve 74 to allow drainage in a similar fashion to drain pipe 24. Thus, again, excess water can be handled by using the treatment pipe which is ordinarily for discharge in reverse order for drainage.

As lift station tank 66 is filled, water from there can, as desired, be pumped via submersible pump 68 and through open control valve 76 and line 78 into storage tank 34. Chemicals can be pumped into storage tank 34 via pump 48 and line 50. Chemicals and stored water can be mixed in storage tank 34 via operation of motor 40 and agitator 38. If one desires to irrigate from storage tank 34, metering valve 54 is open and the water moves because of the static pressure head in storage tank 34 through metering valve 56 outwardly through treatment pipe 16. Likewise, if one desires to aerate the soil and discharge anhydrous ammonia, one simply opens valve 60 and line 62 and operates compressor 58. Thus, fertilizer, chemicals, and any other desirable treatments may be discharged through treatment pipe 16. During the treatment, one can close drain pipe 24 via metering valve 64 if desired to assure maximum saturation with water and nutrients. On the other hand, metering valve 64 can be kept partially opened and nutrients will eventually drain down into drain pipe 24 and can then continuously be pumped through the system to allow increased efficiency. In the most arid of times, drain pipe 24 would be normally closed via metering valve 64. It can therefore be seen that a highly effective system which can operate in dual modes, or in between those dual modes of irrigation and drainage to effectively allow chemicals treatment and application as well, has been developed. One can literally "spoon feed" the crop in any manner desired.

What is claimed is:

1. A field crop subsurface treatment system for treatment of field crops growing on the top soil surface, comprising:
   a treatment pipe submerged under the root storage tank for storing a water load to develop a hydrostatic pressure to power the discharge of materials through the treatment pipe; and
   a drain pipe having a metering valve for opening and closing said drain pipe submerged beneath the treatment pipe;
   said treatment pipe being connected to a water distribution source and a chemicals distribution source, each of which are operatively associated with valves which may be optionally opened to develop hydrostatic pressure to power discharged materials through the treatment pipe or closed;
   said drain pipe being connected to a water storage source for storing field drained water; and
   said water storage source which is in association with said drain pipe being fluidly connected to said water storage tank which is in association with said treatment pipe, whereby stored water from said drain pipe may optionally be circulated into said water storage tank and from said storage tank into said treatment pipe.

2. The system of claim 1 wherein said drain pipe has a metering valve for opening and closing the drain pipe.

3. The system of claim 2 wherein said treatment pipe has a metering valve for opening or closing the treatment pipe.

4. The system of claim 1 wherein said treatment pipe is also connected to a chemical storage tank, which in turn is fluidly connected to said hydrostatic pressure water storage tank.

5. The system of claim 4 wherein said treatment pipe is additionally connected to a source of anhydrous ammonia and a compressor to allow injection of anhydrous ammonia into the treatment pipe.

6. The system of claim 1 wherein said drain pipe is connected to a water lift station which itself is fluidly connected via a control valve to said hydrostatic pressure developing water storage tank.

7. The system of claim 1 wherein said drain pipe is comprised of coventional field tile and has a plurality of spaced apart, laterally extending carrier pipes.

8. The system of claim 1 wherein said treatment pipe is a semi-rigid, flexible, thick-walled plastic pipe having a plurality of laterally extending carrier pipes.

9. The system of claim 1 wherein said treatment pipe is from about one and one-half to about two feet below the root system of any growing row crop.

10. The system of claim 9 wherein said drain pipe is from about three and one-half to about four feet below said treatment pipe.

* * * * *

UNITED STATES PATENT AND TRADEMARK OFFICE
CERTIFICATE OF CORRECTION

PATENT NO. : 4,538,377
DATED : September 3, 1985
INVENTOR(S) : Ken O. Thornton

It is certified that error appears in the above—identified patent and that said Letters Patent is hereby corrected as shown below:

At column 4, line 16, of the patent after "root" and before "storage" insert:

-- system of the crops, and connected to a water --.

Signed and Sealed this

Sixth Day of October, 1992

Attest:

DOUGLAS B. COMER

Attesting Officer      Acting Commissioner of Patents and Trademarks